US009118393B2

(12) United States Patent
Overduin et al.

(10) Patent No.: US 9,118,393 B2
(45) Date of Patent: Aug. 25, 2015

(54) ENHANCING A PUSH-TO-TALK COMMUNICATION SYSTEM

(75) Inventors: Rudy Overduin, Voorschoten (NL); Petrus Johannes Maria Rijsdijk, Leiderdorp (NL); Nils Anders Stefan Gustafsson, The Hague (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 549 days.

(21) Appl. No.: 13/512,141

(22) PCT Filed: Nov. 26, 2010

(86) PCT No.: PCT/NL2010/050797
§ 371 (c)(1),
(2), (4) Date: Jun. 29, 2012

(87) PCT Pub. No.: WO2011/065830
PCT Pub. Date: Jun. 3, 2011

(65) Prior Publication Data
US 2012/0258758 A1   Oct. 11, 2012

(30) Foreign Application Priority Data

Nov. 27, 2009  (EP) .................................. 09177408
Feb. 23, 2010  (EP) .................................. 10154398
Jul. 13, 2010  (EP) .................................. 10169407

(51) Int. Cl.
*H04B 1/38* (2015.01)
*H04B 1/401* (2015.01)

(52) U.S. Cl.
CPC .................................... *H04B 1/401* (2013.01)

(58) Field of Classification Search
CPC ....... H04W 76/005; H04W 4/10; H04W 84/08; H04W 4/08; H04L 29/06442
USPC .................................................. 455/517–519
See application file for complete search history.

(56) References Cited

U.S. PATENT DOCUMENTS 6,370,396 B1 *   4/2002   Meiksin et al. ............... 455/560
2005/0068223 A1 *   3/2005   Vavik ............................. 342/51

FOREIGN PATENT DOCUMENTS

WO     WO 00/72606     11/2000

*Primary Examiner* — Bobbak Safaipour
(74) *Attorney, Agent, or Firm* — Preti Flaherty Beliveau & Pachios LLP (57) ABSTRACT

A peer-to-peer communication system (1) capable of operating in push-to-talk mode comprises terminals (2, 2A, 6) capable of push-to-talk, peer-to-peer radio communication, and an enhancing device (3) arranged for coupling with the terminal. The enhancing device (3) comprises: • an antenna (31) for transmitting and receiving radio signals, • a bandpass filter (32) for selecting a frequency band of the radio signals, • a bidirectional amplifier (33) for amplifying radio signals alternatingly in a transmitting and in a receiving direction, • a control unit (34) for controlling the bidirectional amplifier (32) in response to a sensor signal, and • a sensor (35) for detecting whether the terminal (2A; 6) is transmitting or receiving and for producing the sensor signal in response thereto, which sensor is galvanically isolated from the terminal. The communication system (1) may be a Terrestrial Trunked Radio system, commonly known as TETRA system, more in particular a TETRA system operating in Direct Mode. The antenna (31) may be a can antenna or a loop-fed antenna. Lighting device with a wind-powered cleaning member.

25 Claims, 5 Drawing Sheets

ENHANCING A PUSH-TO-TALK COMMUNICATION SYSTEM

TECHNICAL FIELD

The present invention relates to an enhanced communication system, and a method and a device for enhancing a communication system. More in particular, the present invention relates to enhancing communication in a peer-to-peer wireless communication system capable of operating in push-to-talk mode, the system comprising terminals capable of push-to-talk, peer-to-peer radio communication.

BACKGROUND

Push-to-talk (PTT) communication systems utilize a single radio channel to communicate in both directions, switching between sending and receiving by operating a button on the terminal (typically a handset). The classic example of a push-to-talk communication system is a group of walkie-talkies, which allows alternating communication between two or more users which are in each other's radio range.

Peer-to-peer (PTP) is a communication model in which each party has the same capabilities and each party can initiate a communication session. A pair of walkie-talkies also constitutes a peer-to-peer system.

A well-known communication system suitable for push-to-talk operation is TETRA (TErrestrial Trunked RAdio), which is used in many countries by police forces, emergency services, the national army, and/or train companies. TETRA-based systems for public order and safety are usually known by a national name, such as C2000 in the Netherlands.

TETRA allows one-to-one and one-to-many connections. Although TETRA may use a cellular network, it can also operate in Direct MOde (DMO) in which no cellular network is used and direct (i.e. peer-to-peer) push-to-talk communication between the handsets takes place. In either mode, a so-called dispatcher may operate a handset so as to relay information and coordinate the operations of, for example, an emergency team.

Unfortunately TETRA and similar communication systems have the disadvantage that the wireless connections between the terminals (that is, the handsets) are not always good, resulting in signal distortions and an insufficient audio quality. This is particularly the case in buildings, tunnels and mines, where walls block or at least severely attenuate the signal transmission. It will be clear that a certain minimum required audio quality is essential for communication between members of an emergency team, and that a lost wireless connection may have fatal consequences.

It is therefore highly desirable that a good signal quality of the wireless communication within a push-to-talk communication system is maintained, both in cellular operating conditions in which a cellular network is used, and in direct mode operating conditions, that is, without the assistance of a cellular network. It is known per se to use booster circuits for boosting the signal level of each individual terminal so as to improve the signal quality. However, this requires modifying each terminal, which is relatively expensive, and may still not result in a satisfactory minimum audio quality level. In addition, typical known power booster circuits are unsuitable for push-to-talk applications.

Korean Patent Application KR 2000 0067527, for example, discloses a power booster circuit for a portable CDMA (Code Division Multiple Access) terminal in a cellular communication system using cells and base stations. This known power booster circuit, which has a variable gain and uses several distinct frequencies, is not suitable for push-to-talk systems which use a single frequency for both transmission and reception. In addition, every portable terminal will have to be provided with this known power booster circuit for it to be effective.

European Patent Application EP 0 599 659 discloses a booster for use with a portable radio apparatus. The power amplifier of the booster is unidirectional, thus making the known booster unsuitable for push-to-talk systems. In addition, the power amplifier is switched on and off in response to a control signal generated by a control signal generator circuit of the portable radio apparatus. Accordingly, the known booster is not suitable for portable radio apparatus which is not fitted with such a control signal generator circuit, and can therefore not be used with existing portable radio apparatus.

Furthermore, International Patent Application WO 00/72606 discloses a system for communication within an energy-transmission-limited environment. RF transceivers are distributed throughout the site and are at each location connected to a control unit which provides both power and allows communication. This known arrangement requires a networked structure and a software-controlled architecture and is therefore relatively complicated. In addition, this known arrangement cannot be moved easily.

Cell enhancers are known that offer signal enhancement of cellular communication. However, such cell enhancers disturb the existing cell planning of the network and therefore require a careful tuning to minimise this disturbance. They are therefore not suitable for ad-hoc coverage enhancement. In addition, they are unsuitable for enhancing direct mode communication.

BRIEF SUMMARY

It is an object of the present invention to overcome these and other problems of the Prior Art and to provide a device for enhancing communication in a push-to-talk communication system which improves both the transmission and the reception while requiring a minimum amount of modifications to the communication system.

It is a further object of the present invention to provide a method of enhancing communication in a push-to-talk communication system and an enhanced push-to-talk communication system which offer the above-mentioned advantages.

Accordingly, the present invention provides an enhancing device for enhancing communication in a peer-to-peer communication system capable of operating in push-to-talk mode, the communication system comprising terminals capable of push-to-talk, peer-to-peer radio communication, the enhancing device being arranged for coupling with a terminal and comprising:

- an antenna for transmitting and receiving radio signals,
- a band-pass filter for selecting a frequency band of the radio signals,
- a bidirectional amplifier for amplifying radio signals alternatingly in a transmitting and in a receiving direction,
- a control unit for controlling the bidirectional amplifier in response to a sensor signal, and
- a sensor for detecting whether the terminal is transmitting or receiving and for producing the sensor signal in response thereto, which sensor is galvanically isolated from the terminal.

By providing an antenna which is suitable for both transmitting and receiving radio signals, communication can take place using only a single antenna. By providing a band-pass filter, a suitable frequency band can be selected and other frequency bands can be excluded. By providing a control unit, the bidirectional amplifier can be switched between amplifying radio signals which are to be transmitted and amplifying received radio signals. And by providing a galvanically isolated sensor, the bidirectional amplifier can be switched without influencing the operation of the terminal the enhancing device is coupled with. The enhancing device of the present invention is thus capable of improving the signal levels and hence the audio quality of both the transmitted and the received radio signals.

A terminal provided with an enhancing device may be referred to as enhanced terminal and will typically be used as a primary or dispatcher unit, while terminals not provided with an enhancing device will typically be used as secondary or member units. In other words, an enhanced terminal of the system may be designated dispatcher unit and may also be referred to as primary unit, while the non-enhanced terminals may be designated member units and may also be referred to as secondary units. A primary unit and a secondary unit are functionally distinct but may be technically identical, except for the enhancing device which may be coupled to a primary unit in accordance with the present invention.

In typical embodiments, the dispatcher unit will be used by the (human) "dispatcher" referred to above and will be used to relay information and/or to coordinate and direct the operations of a team, for example, but not exclusively, an emergency team. When the dispatcher unit comprises a dedicated handset or similar terminal, the human "dispatcher" will typically be local and may directly operate the dispatcher unit. However, when the dispatcher unit comprises a gateway unit, the human "dispatcher" will typically be remote.

In a communication system according to the present invention, most terminals will typically not be provided with an enhancing device: the system will typically comprise a single dispatcher unit (that is, a single primary unit), comprising an enhancing device, and a plurality of member units (that is, multiple secondary units) which are not provided with an enhancing device. Thus a single enhancing device typically suffices for a system having a plurality of member units. This feature makes the present invention both relatively inexpensive and simple to implement.

Alternatively, several dispatcher (or primary) units, each comprising an enhancing device, may be used, these primary units preferably being interconnected wirelessly. In such an embodiment, the antennas of the primary units preferably have a low or even zero gain to allow equivalent interconnections between all enhanced primary units.

In other embodiments, however, it is preferred that the antenna has a high gain, preferably as high as the operational situation permits so as to reduce the power consumption of the bidirectional amplifier. In particular a gain of at least 6 dBi (decibel isotropic) is preferred, but higher antenna gains, for example 20 dBi, are also possible and will further improve the effectiveness of the present invention.

Several types of (directional) antenna can be used, and the particular dimensions of the antenna will depend on the frequencies used and the particular application. In a preferred embodiment, which is suitable for TETRA use, the directional antenna has a substantially cylindrical body, the diameter of the body preferably being at least 50 cm, more preferably at least 60 cm, and the length of the body being at least 60 cm, preferably 70 cm. By using a substantially cylindrical antenna, such as a so-called can antenna (also referred to as "cantenna"), of suitable dimensions a gain can be obtained with an antenna having a simple and relatively compact structure. A can antenna has a cylindrical body which is closed at one end and open at the other end. Although a diameter of at least 50 cm is preferred, smaller antennas may be used for higher frequencies, for example antennas having a diameter of approximately 20 cm.

Advantageously, the antenna may have a directivity which is preferably determined by operational requirements. The antenna may further be tuneable by means of, for example, a sliding feed so as to adjust the antenna to a particular frequency range.

In an alternative embodiment which may also be suitable for terrestrial trunked radio (TETRA) use, a Loop-Fed Antenna (LFA) may be used. This antenna type is derived from the well-known Yagi type antenna. Although an LFA is less robust than a can antenna and has a more complex design, it has a smaller volume and a lower weight. In an embodiment which is particularly suitable for TETRA use, the Loop-Fed Antenna consists of a rod reflector, a loop driven element and two rod directors. All elements are symmetrically mounted, either galvanically or non-galvanically, on a common (and preferably electrically conducting) support. An exemplary embodiment may measure 42 by 40 cm while having a depth of only a few centimeters.

Although the enhancing device of the present invention may be suitable for various types of communication systems, it is preferred that the enhancing device is designed for a terrestrial trunked radio (TETRA) direct mode operations (DMO) frequency range, for example between approximately 380 MHz and 390 MHz. In some embodiments, the band-pass filter may be adjustable (e.g. switchable) so as to be suitable for more than one type of frequency range, for example to suit various types of communication systems.

In order to achieve an equivalent quality improvement at both transmission and reception, it is preferred that the noise figure of the reception amplification part of the bidirectional amplifier is sufficiently low.

To achieve an equivalent quality improvement at both transmission and reception, it is preferred that the bidirectional amplifier is configured for providing a substantially larger amplification in the receiving direction than in the transmitting direction. This also has the advantage that any received radio signals are strongly amplified, while limiting the relative amplification of transmitted radio signals, thus avoiding any undesired imbalance between the terminal provided with the enhancing device and terminals of other groups. In addition, the larger amplification in the receiving direction will allow, prior to transmission, notification of any other signals coincidentally having the same frequency, thus avoiding any undesired interference.

The sensor may comprise a transformer so as to provide a galvanically isolated coupling. The connection between the enhancing device and the dispatcher unit may be either wired or wireless.

The present invention also provides a peer-to-peer communication system capable of operation in push-to-talk mode, the communication system comprising:
 terminals capable of push-to-talk, peer-to-peer radio communication, and
 an enhancing device arranged for coupling with a terminal, the enhancing device comprising:
 an antenna for transmitting and receiving radio signals,
 a band-pass filter for selecting a frequency band of the radio signals,
 a bidirectional amplifier for amplifying radio signals alternatingly in a transmitting and in a receiving direction,
 a control unit for controlling the bidirectional amplifier in response to a sensor signal, and a sensor for detecting whether the terminal is transmitting or receiving and for producing the sensor signal in response thereto, which sensor is galvanically isolated from the terminal.

The terminal the enhancing device is coupled with may comprise a unit for use by a dispatcher and/or commander, or may comprise a gateway for providing access to a cellular network part.

The communication system is preferably a TETRA (Terrestrial Trunked RAdio) system, although the invention is not so limited.

The present invention additionally provides a method of enhancing communication in a peer-to-peer communication system capable of operating in push-to-talk mode, the communication system comprising terminals capable of push-to-talk, peer-to-peer radio communication, the method comprising the step of coupling an enhancing device for enhancing communication with a terminal, the enhancing device comprising:

an antenna for transmitting and receiving radio signals,
    a band-pass filter for selecting a frequency band of the radio signals,
    a bidirectional amplifier for amplifying radio signals alternatingly in a transmitting and in a receiving direction,
    a control unit for controlling the bidirectional amplifier in response to a sensor signal, and
    a sensor for detecting whether the terminal is transmitting or receiving and for producing the sensor signal in response thereto, which sensor is galvanically isolated from the terminal.

The communication system preferably operates in direct mode. The method may comprise the further step of directing the antenna towards a desired coverage area.

BRIEF DESCRIPTION OF DRAWINGS

The present invention will further be explained below with reference to exemplary embodiments illustrated in the accompanying drawings, in which.

DETAILED DESCRIPTION

Figure 1A:
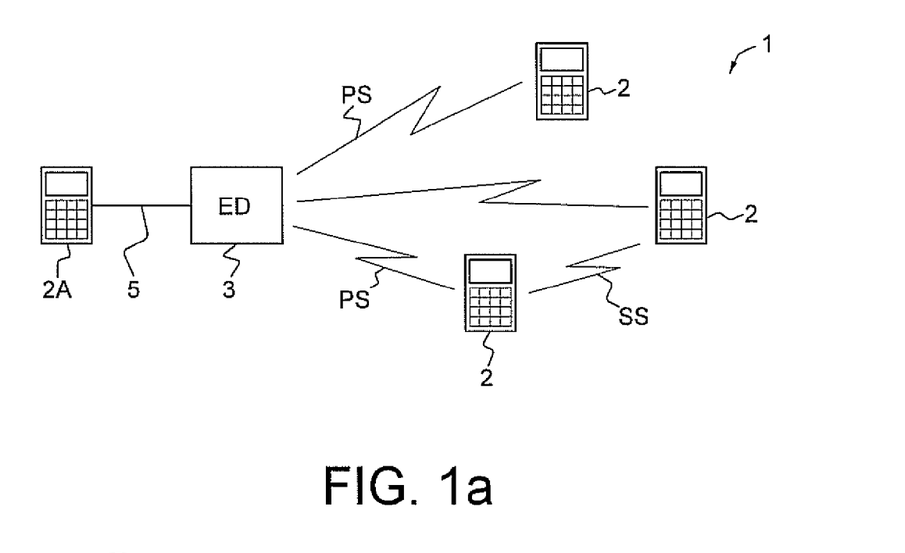
FIGS. 1a-1c schematically show various embodiments of a communication system according to the present invention, while FIG. 1d schematically shows interconnected communication systems according to the present invention.

The embodiment of the communication system 1 shown merely by way of non-limiting example in FIG. 1a comprises terminals 2 and an enhancing device (ED) 3. One terminal, labelled 2A, serves as a primary terminal, while the other terminals are secondary terminals. As illustrated in FIG. 1a, the enhancing device 3 is coupled to the primary terminal 2A by a cable 5, although a wireless connection is also possible.

The communication system 1 is a wireless push-to-talk communication system providing direct communication between the terminals, without involving a cellular network. Three types of direct communication are possible:

1. between the (enhanced) primary unit on the one hand and the secondary units on the other hand: primary-secondary communication PS, and
    2. between the secondary units: secondary-secondary communication SS, and
    3. between (enhanced) primary units: primary-primary communication PP.

All three types of direct communication are possible in both directions, that is, are preferably bidirectional. Only the primary-primary communication PP and the primary-secondary communication PS are enhanced by the enhancing unit 3, the secondary-secondary communication SS is unaltered.

In the embodiment of FIG. 1a, the primary terminal 2A serves as a dispatcher unit and is typically operated by a human dispatcher who uses the primary terminal 2A to relay information and/or to coordinate and direct the operations of a team, for example, but not exclusively, an emergency team.

The communication system 1 is preferably a TETRA (Terrestrial Trunked Radio) system, that is, a system designed to suit the TETRA (ETSI) standard. However, the present invention is not limited to TETRA compatible communication systems and may also be used in push-to-talk communication systems which do not, or not fully, comply with the TETRA standard.

As can be seen in FIG. 1a, only a single enhancing device 3 is used with a plurality of terminals (that is, handsets) 2. According to the present invention, a single enhancing device coupled to the main terminal will typically suffice to enhance the signal quality of the primary-secondary radio links PS in the communication network. In certain cases, however, a second or even third enhancing device may be used in a single communication system (typically consisting of a group of cooperating terminals located in each other's proximity).

Figure 1B:
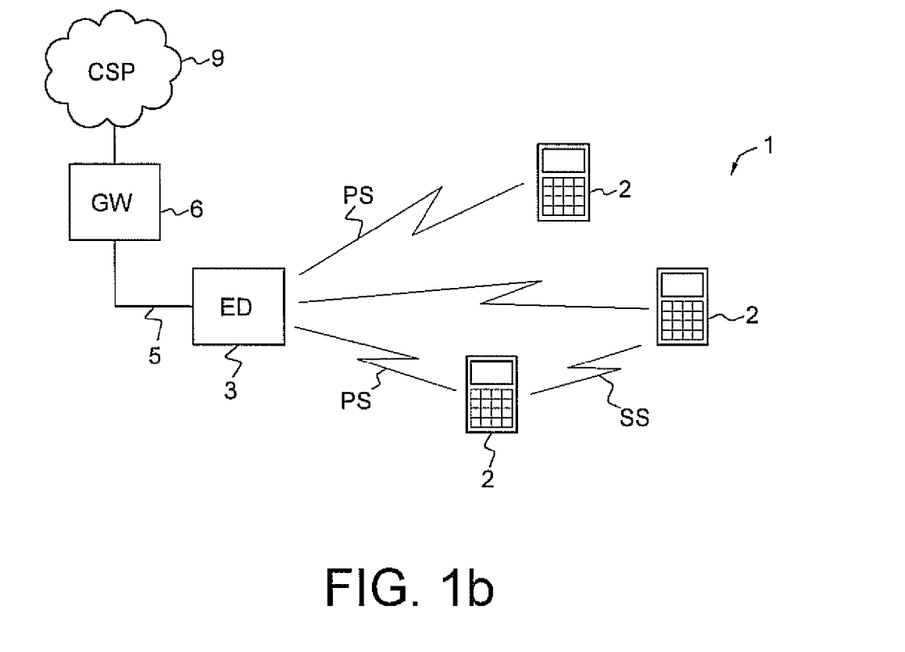

The embodiment of FIG. 1b also comprises terminals 2 and an enhancing device (ED) 3. Instead of a regular terminal, a gateway (GW) unit 6 serves as primary terminal or dispatcher unit. As illustrated in FIG. 1b, the enhancing device 3 is coupled to the gateway unit 6 by a cable 5, although a wireless connection is also possible.

The gateway unit 6 is coupled to a cellular network part (CSP) 9 which allows cellular communication. In this way, a remote human dispatcher may use the communication system 1 via a cellular network. In this embodiment, both push-to-talk, peer-to-peer and cellular communication may be possible. The present invention, however, relates only to the push-to-talk, peer-to-peer communication.

Figure 1C:
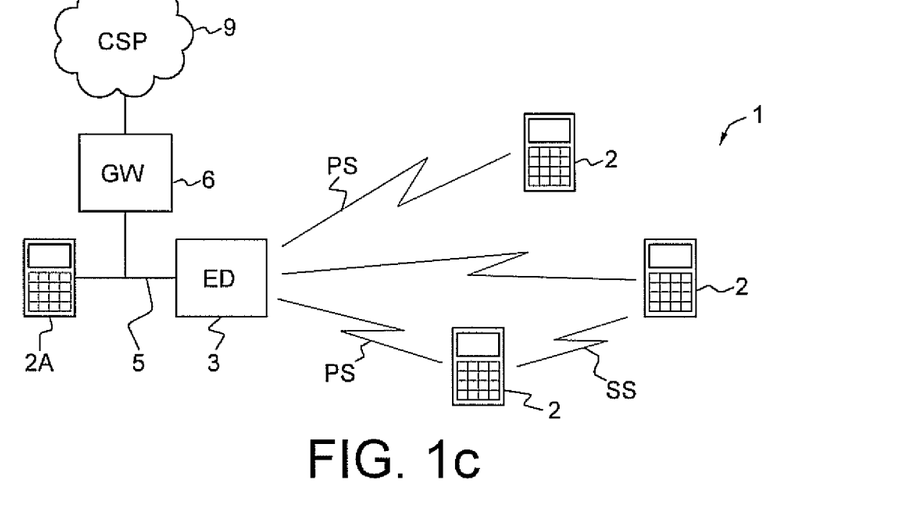

The embodiment of FIG. 1c combines the previous two embodiments and comprises both a regular terminal 2A and a gateway unit 6, thus allowing both a local and a remote human dispatcher.

Figure 1D:
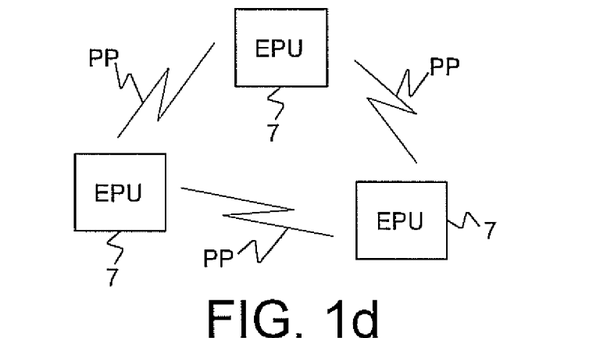

The interconnection of enhanced terminals is schematically illustrated in FIG. 1d. In the embodiment shown, three enhanced terminals, referred to here as enhanced primary units, communicate wirelessly using primary-primary communication PP, which communication PP is constituted by wireless links. Each enhanced primary unit (EPU) 7 comprises a primary unit (2A in FIG. 1a) and an enhancing device (3 in FIG. 1a), connected by a wired or wireless connection (5 in FIG. 1a). An enhanced primary unit or enhanced terminal 7 may also comprise a gateway unit (6 in FIG. 1b) instead of a primary unit, or may comprise both a primary unit and a gateway unit, as illustrated in FIG. 1c.

Figure 2:
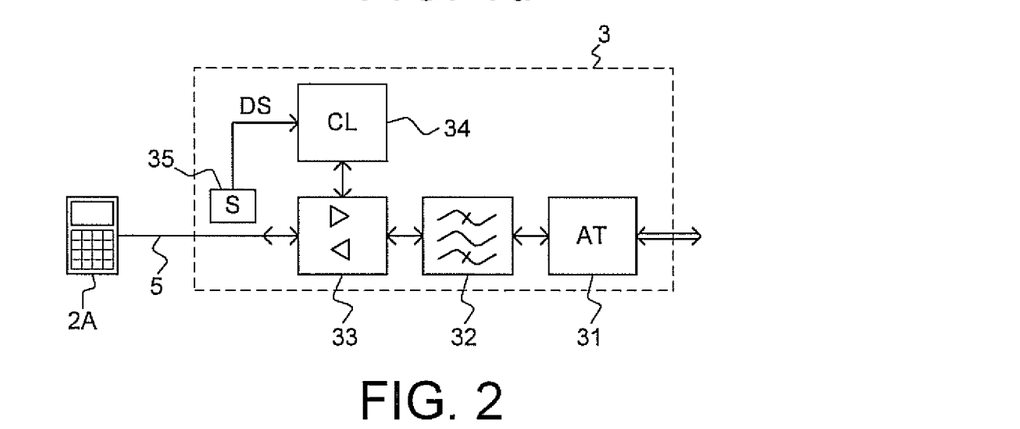
FIG. 2 schematically shows a dispatcher unit provided with an enhancing device according to the present invention.

A preferred embodiment of the enhancing device 3 according to the present invention is shown in more detail in FIG. 2. The enhancing device 3 of FIG. 2 comprises an antenna (AT)

Figure 3:
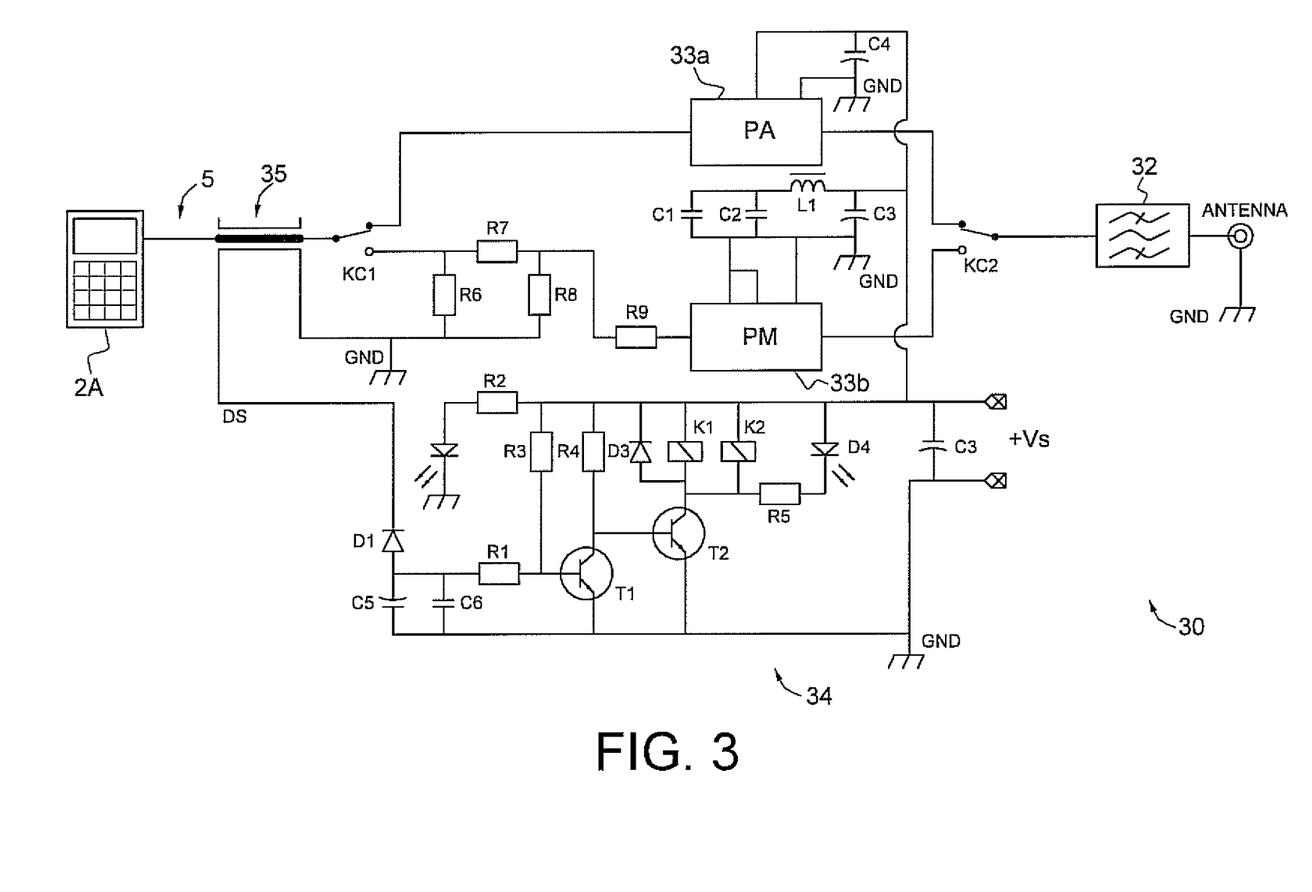
FIG. 3 schematically shows a circuit diagram of an exemplary embodiment of an enhancing device according to the present invention.

31, a band-pass filter 32, a bidirectional amplifier 33, a control (CL) unit 34 and a sensor (S) 35. In a typical embodiment, as shown for example in FIG. 3, the bidirectional amplifier 33, the control unit 34 and the sensor 35 will together constitute a physical electronic unit (30 in FIG. 3) which can be connected to the antenna 31 to form the enhancing device 3. The electronic unit is preferably connected to the antenna 31 via band-pass filter 32, which in some embodiments is part of the electronic unit 30 but may in other embodiments be constituted by a separate physical unit, connected between the electronic unit 30 and the antenna unit 31, as illustrated in FIG. 3.

The bidirectional amplifier 33 receives radio signals to be transmitted from the (main) terminal 2A (and/or a gateway unit 6) via a connection 5, which preferably is constituted by a wired connection but may also be constituted by a wireless connection. These radio signals would, in the absence of the enhancing device 3, be fed to the (built-in) antenna of the terminal 2A (depending on the particular terminal, the radio signals may be fed to both the terminal's own antenna and the enhancing device 3). The sensor 35 detects whether the terminal 2A is sending or receiving and sends a detection signal (DS) to the control unit 34, which in dependence of the detection signal from the sensor switches the bidirectional amplifier 33 in a sending or receiving mode. In the present example, in which the terminal 2A produces radio signals and is therefore sending, the bidirectional amplifier will be switched into the sending mode.

The frequency range of the amplified signal is limited by the band-pass filter 32, which is preferably designed to match a suitable TETRA frequency if the enhancing unit is intended for use in TETRA networks. The thus filtered radio signals are fed to the antenna 31 and broadcast. In use, the antenna 31 is directed towards the secondary terminals, or at least towards those terminals of the system which suffer from a bad reception, for example terminals located inside buildings, caves or tunnels, or terminals located too far away from the dispatcher unit.

The antenna 31 may also receive radio signals from the other terminals (2 in FIG. 1). These radio signals are filtered by the (bidirectional) band-pass filter 32 and fed to the bidirectional amplifier 33. If the bidirectional amplifier 33 is in the receiving mode (as determined by the control unit 34), it will amplify the received radio signals and pass them on to the terminal 2A (or, in other embodiments, to the gateway unit 6) via the connection 5.

According to a further aspect of the present invention, the bidirectional amplifier 33 is designed for providing a substantially larger amplification in the receiving direction than in the transmitting direction so as to provide an equivalent quality improvement in both transmission and reception. The relatively large amplification in the receiving direction additionally allows any other signals that may have the same transmission frequency to be detected more easily. To achieve an equivalent quality improvement in both transmission and reception, and thus an equivalence between transmission and reception signal quality, it is further preferred that the noise figure of the reception amplification part of the bidirectional amplifier 33 is sufficiently low.

A merely exemplary embodiment of the enhancing device 3 is shown in more detail in FIG. 3. The embodiment of FIG. 3 also comprises a band-pass filter 32, a bidirectional amplifier 33, a control unit 34 and a sensor (unit) 35. A dispatcher unit, in the present embodiment comprising a regular terminal 2A, is coupled to an input of the enhancing device 3 via a connection 5. The band-pass filter 32 may be coupled to the antenna.

In the embodiment of FIG. 3, the bidirectional amplifier comprises a first amplifier part 33a, which amplifies in the transmitting direction, and a second amplifier part 33b, which amplifiers in the receiving direction. The first amplifier part 33a is, in the embodiment shown, constituted by a pre-amplifier (PA), while the second amplifier part 33b is constituted by a power module (PM). Relay switches KC1 and KC2 determine which of the two amplifier parts is connected to the main terminal 2A and the band-pass filter 32.

The relay switches KC1 and KC2 are operated by relays K1 and K2 respectively. These relays K1 and K2 are part of the control unit 34, which comprises a transistor pair T1, T2 to produce the relay current in response to the detection signal DS produced, in turn, by the sensor 35. LED (Light Emitting Diode) D4 indicates whether the enhancing device is in transmitting mode, while LED indicates whether the power (+Vs) is on.

In the embodiment shown, the sensor 35 comprises a coaxial relay so as to provide a galvanically isolated coupling with the connection 5. This offers the advantage that the terminal the enhancing device is coupled with (i.e. the terminal 2A in the example of FIG. 3) can be of arbitrary type, as long as it is suitable for use in a push-to-talk system or at least push-to-talk mode. In addition, this modularity does not require alteration of the dispatcher unit. In practice, the galvanic isolation also allows a swift coupling and/or decoupling of the dispatcher unit.

Figure 4A:
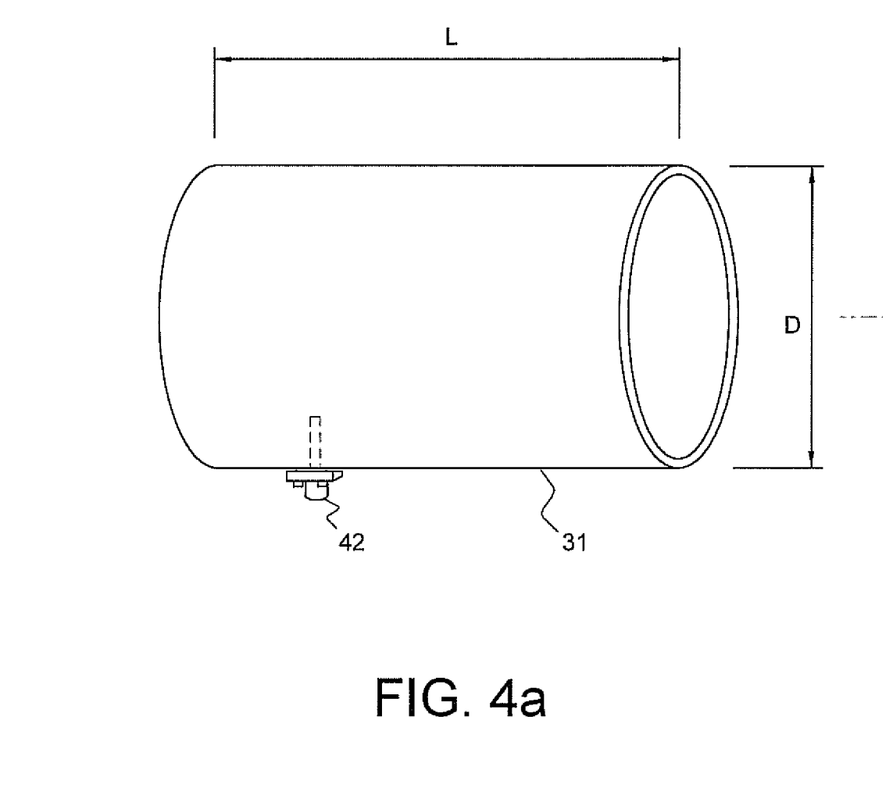
FIGS. 4a-4b schematically show a can antenna as may be used in an enhancing device according to the present invention, in both a perspective view and a cross-sectional view.
Figure 4B:
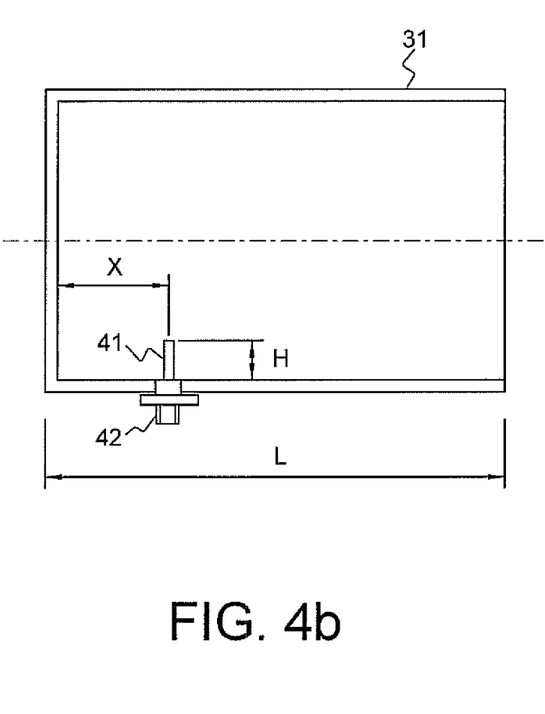

The merely exemplary can antenna 31 illustrated in FIGS. 4a & 4b has a substantially cylindrical body having a length L and a diameter D. One end of the cylinder is open while the opposite end is closed. Inside the cylindrical body an antenna element 41 is located, which is connected to an external antenna plug 42. Inside the antenna body, the antenna element 41 protrudes over a distance H, at a distance X from the back wall (that is, the closed end of the cylinder), as shown in FIG. 4b. The values of H and X are chosen so as to match the particular frequency range of the application. The distance X may be adjustable so as to provide a tuneable antenna. To this end, the antenna element 41 may be slideable with respect to the antenna body. To this end, a suitable slot (not shown) may be provided in the antenna body.

The can antenna shown in FIGS. 4a & 4b is robust and resistant to wear and tear, and to high temperatures, shocks and molest. The particular shape illustrated in FIGS. 4a & 4b is a basic shape and suitable modifications may be made to allow vehicle mounting.

Figure 5:
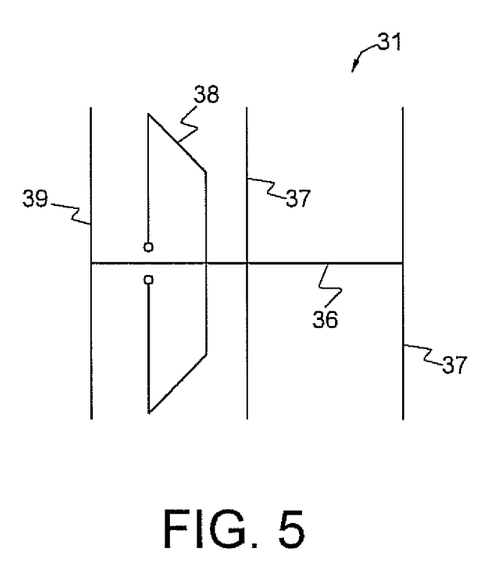
FIG. 5 schematically shows a loop-fed antenna as may be used in an enhancing device according to the present invention.

If a more compact antenna is desired, a Loop-Fed Antenna (LFA) may be used. However, an LFA is not as robust as a can antenna and requires a more careful design to obtain the required radiation characteristics over the desired frequency band. An exemplary embodiment of a loop-fed antenna is shown in FIG. 5. The embodiment of FIG. 5 has a basic shape and suitable modifications may be made to better adapt the antenna to vehicle mounting. The LFA embodiment 31 of FIG. 5 comprises a support 36 on which two rod directors 37, a loop driven element 38 and a rod reflector 39 are mounted. The support 36 is preferably electrically conducting. The antenna structure of FIG. 5 is flat and therefore relatively easy to transport.

A manual or automatic direction unit may be provided to direct the (can or loop-fed) antenna towards an object or area. The can antenna may also have an electronically controlled feed. Some embodiments may be collapsible so as to facilitate transporting the unit.

The present invention is based upon the insight that the combination of a directional antenna, a bidirectional amplifier and a suitable amplifier control circuit provides a simple yet effective way to enhance the communication in a push-to-talk communication system. The present invention benefits from the further insights that a can antenna or a loop-fed antenna is particularly suitable for the present purpose, and that only a single device according to the present invention is sufficient to enhance the signal quality in a push-to-talk communication system.

The enhancing unit is robust and inexpensive to manufacture, while operational costs are low. As existing terminals can be used, the personnel utilizing a communication system which is enhanced according to the present invention requires only a minimum of training. The ad-hoc deployment feature of the enhancing device does not limit its use to indoor applications but also allows outdoor applications, such as range extensions, for example of the TETRA DMO range.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

What is claimed is:

1. An enhancing device for enhancing communication in a peer-to-peer communication system capable of operating in push-to-talk mode, the communication system comprising terminals capable of push-to-talk, peer-to-peer radio communication directly between the terminals, without involving a cellular network using wireless radio signals, the enhancing device being arranged for coupling with a terminal and comprising:
   an antenna for transmitting and receiving the wireless radio signals,
   a band-pass filter for selecting a frequency band of the radio signals,
   a bidirectional amplifier for amplifying the radio signals alternatingly in a transmitting direction from the terminal to the antenna and in a receiving direction from the antenna to the terminal,
   a control unit for controlling switching of the bidirectional amplifier between the transmitting direction and the receiving direction in response to a sensor signal,
   a connection for transmitting and receiving the radio signals to and from the terminal, the band-pass filter and the bidirectional amplifier being coupled between the connection and the antenna for passing the radio signals by means of band-pass filtering and amplification, and
   a sensor for detecting whether the terminal is transmitting or receiving the radio signals and for producing the sensor signal in response thereto, wherein the sensor is galvanically isolated from the terminal.

2. The device according to claim 1, wherein the antenna has a gain which is as high as possible given operational requirements of the terminal, the gain being at least 6 dBi.

3. The device according to claim 1, wherein the antenna has one of: a low gain, and a zero gain.

4. The device according to claim 1, wherein the antenna has a directivity which is preferably determined by operational requirements.

5. The device according to claim 1, wherein the antenna is tuneable.

6. The device according to claim 1, wherein the antenna has a substantially cylindrical body, the diameter of the body being one of: at least 50 cm, and at least 60 cm.

7. The device according to claim 1, wherein the antenna has a substantially flat structure comprising multiple antenna elements.

8. The device according to claim 7, wherein the antenna comprises a support on which at least one rod director, a loop driven element and a rod reflector are mounted, the support being electrically conducting.

9. The device according to claim 1, wherein the band-pass filter is designed for a frequency range of a terrestrial trunked radio system operating in direct mode.

10. The device according to claim 1, wherein the bidirectional amplifier is arranged for providing a substantially larger amplification in the receiving direction than in the transmitting direction, and has a low noise figure.

11. The device according to claim 1, wherein the sensor comprises a transformer so as to provide a galvanically isolated coupling.

12. The device according to claim 1, wherein said connection is adapted to provide a wired connection with the terminal.

13. The device according to claim 1, wherein said connection is adapted to provide a wireless connection with the terminal.

14. A peer-to-peer communication system capable of operating in push-to-talk mode, the communication system comprising:
   terminals capable of push-to-talk, peer-to-peer radio communication directly between the terminals, without involving a cellular network using wireless radio signals, and
   an enhancing device arranged for coupling with a terminal, the enhancing device comprising:
   an antenna for transmitting and receiving the radio signals,
   a band-pass filter for selecting a frequency band of the radio signals,
   a bidirectional amplifier for amplifying the radio signals alternatingly in a transmitting direction from the terminal to the antenna and in a receiving direction from the antenna to the terminal,
   a connection to the terminal, the band-pass filter and the bidirectional amplifier being coupled between the connection and the antenna for passing the radio signals between the antenna and the terminal by means of band-pass filtering and amplification,
   a control unit for controlling switching of the bidirectional amplifier between the transmitting direction and the receiving direction in response to a sensor signal, and
   a sensor for detecting whether the terminal is transmitting or receiving the radio signals and for producing the sensor signal in response thereto, wherein the sensor is galvanically isolated from the terminal.

15. The communication system according to claim 14, wherein the terminal the enhancing device is coupled with comprises a terminal for use by a dispatcher or commander.

16. The communication system according to claim 14, wherein the terminal the enhancing device is coupled with comprises a gateway for providing access to a cellular network part.

17. The communication system according to claim 14, which is a cellular system capable of push-to-talk communication in peer-to-peer mode.

18. The communication system according to claim 14, which is a TETRA system.

19. The communication system according to claim 14, further comprising a directing unit for directing the antenna to a desired coverage area.

20. A method of enhancing communication in a peer-to-peer communication system capable of operating in push-to-talk mode, the communication system comprising:
terminals capable of push-to-talk, peer-to-peer radio communication directly between the terminals, without involving a cellular network using wireless radio signals, and
a dispatcher unit for dispatching information to the terminals,
the method comprising the step of coupling an enhancing device for enhancing communication with a terminal, the enhancing device comprising:
an antenna for transmitting and receiving the radio signals,
a band-pass filter for selecting a frequency band of the radio signals,
a bidirectional amplifier for amplifying the radio signals alternatingly in a transmitting direction from the terminal to the antenna and in a receiving direction from the antenna to the terminal,
a control unit for controlling switching of the bidirectional amplifier between the transmitting direction and the receiving direction in response to a sensor signal,
a connection to the terminal, the band-pass filter and the bidirectional amplifier being coupled between the connection and the antenna for passing the radio signals between the antenna and the terminal by means of band-pass filtering and amplification, and
a sensor for detecting whether the terminal is transmitting or receiving the radio signal and for producing the sensor signal in response thereto, wherein the sensor is galvanically isolated from the terminal.

21. The method according to claim 20, comprising the further step of directing the antenna towards a desired coverage area.

22. The method according to claim 20, wherein the communication system is a TETRA system.

23. The method according to claim 22, wherein the communication system operates in direct mode.

24. The device according to claim 2, wherein:
the antenna has a directivity which is preferably determined by operational requirements;
the antenna is tuneable;
the antenna has a substantially cylindrical body, a diameter of the body being one of: at least 50 cm, and at least 60 cm;
the antenna has a substantially flat structure comprising multiple antenna elements;
the antenna comprises a support on which at least one rod director, a loop driven element and a rod reflector are mounted, the support preferably being electrically conducting;
the band-pass filter is designed for a frequency range of a terrestrial trunked radio system operating in direct mode;
the bidirectional amplifier is arranged for providing a substantially larger amplification in the receiving direction than in the transmitting direction, and has a low noise figure;
the sensor comprises a transformer so as to provide a galvanically isolated coupling;
the device is adapted for a wired connection with the terminal; and
the device is adapted for a wireless connection with the terminal.

25. The communication system according to claim 14, wherein the terminal comprises a built in further antenna for transmitting and receiving the radio signals.

* * * * *